United States Patent Office 3,340,137
Patented Sept. 5, 1967

3,340,137
UNITARY WEATHER-RESISTANT DECORATIVE LAMINATE AND METHOD OF MAKING SAME
Musa Rasim Kamal, Stamford, Conn., assignor to Formica Corporation, Cincinnati, Ohio, a corporation of Delaware
No Drawing. Filed Jan. 23, 1964, Ser. No. 339,588
14 Claims. (Cl. 161—184)

ABSTRACT OF THE DISCLOSURE

A unitary heat and pressure consolidated weather-resistant decorative laminated article comprising a rigidity-imparting base member, a print sheet member bonded to said base member and coated with a copolymer of a monoethylenically unsaturated hardening comonomer and a monoethylenically unsaturated comonomer containing a functional group reactive with hexamethoxymethyl melamine or a 3,4-epoxycyclohexylmethyl 3,4-epoxycyclohexanecarboxylate and surfaced with an adherable film of polyvinyl fluoride.

---

This invention relates to novel unitary heat- and pressure-consolidated decorative laminated articles and to processes for preparing such articles.

More particularly, this invention relates to novel heat- and pressure-consolidated thermoset resin-bonded multilayer decorative laminates suitable for outdoor use wherein the decorative surface comprises a print sheet member overlaid with a substantially transparent polyvinyl fluoride film bonded directly to said print sheet member by means of a thermoset adhesive resin, which in its uncured state is a curable resinous composition comprising a reactive water-insoluble essentially linear thermoplastic vinyl copolymer and a cross-linking amount of either a 3,4-epoxycyclohexylmethyl 3,4-epoxycyclohexanecarboxylate or hexamethoxymethylmelamine.

The many commercially available varieties of polymeric fluorocarbon films have made possible substantially transparent surfacing materials which are resistant to the extremes of weather conditions in outdoor applications such as finishes for metals, fibrous materials, and plastics in architectural, decorative, or industrial structures. Polyvinyl fluoride is an example of a fluorocarbon film which has enjoyed wide acceptance due to its ability to maintain toughness and flexibility over wide ranges of temperature and other conditions of outdoor use. Moreover, such films are resistant to chemicals and common solvents, maintain the necessary level of hydrolytic stability, and are available in an unpigmented, substantially transparent form.

In order to display an underlying decorative pattern as well as to obtain the foregoing properties, it is important that a firm bond be achieved between the substantially transparent polyvinyl fluoride surface layer and the print sheet member. For this purpose, there have been suggested various transparent adhesive resins of the epoxy, acrylic, and polyester type. However, despite the generally excellent bond achieved by the use of the foregoing types of adhesive resins when used to bond pigmented or opaque type polyvinyl fluoride films to decorative print sheet members or other substrate materials, there remains a need for an adhesive agent which will effectively bond the substantially transparent grade of polyvinyl fluoride film to decorative print sheet members employed in weather-resistant decorative laminated articles.

One of the objects of the present invention is to provide a weather resistant decorative laminated article having a substantially transparent top film of a polymeric fluorocarbon which is tightly bonded to an underlying print sheet member such that the entire assembly when heat- and pressure-consolidated with a rigidity-imparting base member, will be useful in a wide range of outdoor architectural, decorative, and industrial applications. A further object of this invention is to provide a process for preparing a unitary weather-resistant decorative laminated article having the aforementioned composition and properties. These and other objects of the present invention will be discussed in greater detail hereinbelow.

In accordance with this invention, these objects are achieved by a unitary heat- and pressure-consolidated weather-resistant decorative laminated article which comprises (I) a rigidity-imparting base member, (II) a print sheet member bonded to said base member and coated with a substantially cured composition which, in its uncured state, is a curable adhesive mixture comprising (A) a reactive, water-insoluble essentially linear copolymer of (1) from about 50% to 98% by weight of a monoethylenically unsaturated hardening comonomer containing no functional groups reactive with component (B) as defined herein below, (2) from about 50% to 2% by weight of a monoethylenically unsaturated comonomer containing at least one functional group reactive with component (B), and (3) from about 0% to 45% by weight of a monoethylenically unsaturated softening comonomer containing no functional groups reactive with component (B), wherein the sum of the amounts of (1), (2) and (3) is 100%, and (B) is a cross-linking amount of a member selected from the group consisting of a 3,4-epoxycyclohexylmethyl 3,4-epoxycyclohexanecarboxylate and hexamethoxymethylmelamine, and (III) a substantially transparent top film of adherable polyvinyl fluoride, an adherable side of which is directly bonded to said print sheet member by means of said adhesive mixture.

The polyvinyl fluoride film employed in the practice of this invention is a commercially available material having a thickness of from about 0.5 to 4 mils. The particular grade of film is that which is clear or substantially transparent, i.e., a film which is non-pigmented. In addition, the polyvinyl fluoride film must be pre-treated to render at least one side thereof adherable. By "adherable" is meant any condition imposed on a surface of the film by various physical or chemical techniques to render the surface of the film susceptible to bonding with conventional substrates, among which are included cellulosic materials, e.g., wood, paper, fiber board, and the like; metals, e.g., galvanized steel, aluminum, and the like; flexible plastics, felts, papers and the like; as well as conventional thermoplastics and thermosetting resinous surfaces.

Methods of manufacturing polyvinyl fluoride films useful in the present invention are well known in the art and therefore need not be described herein. One such method is that of U.S. Patent 2,953,818, herein incorporated by reference. The various treatments used to render one or both surfaces of polyvinyl fluoride films adherable are also known in the art, e.g., Belgian Patents 610,318, 619,638 and 620,723.

Thus, in Belgian Patent 619,638 there is described a method of making one side of a polyvinyl fluoride film adherable without affecting the non-adherability of the other side by passing the film around an electrically grounded rotating drum while the outer face is electrically charged by passage close to a D.C. electrode, causing the film to adhere strongly to the drum. The film is next passed a certain distance from a set of tubular electrodes carrying an A.C. current. Nitrogen is flowed through the tubes and into the space between the electrodes and the drum. The film is then conducted away from the grounded drum. Belgian Patent 620,723 is a variation on the foregoing process and involves exposing the films of polymerized fluorinated hydrocarbons to an electric discharge in an atmosphere having a limited moisture content by passing the film around a grounded rotating drum serving as the negative electrode, with one or more positive electrodes affixed a certain distance from the drum and parallel to its axis of rotation. During this treatment, the atmosphere having limited moisture content is constantly renewed through outlets near the electrodes. For further details see the aforementioned Belgian patents which are herein incorporated by reference.

A convenient method for determining whether a surface of a polyvinyl fluoride film is adherable for the purposes of the present invention is to compare the behavior of an unknown film (X) to the behavior of a film (N) which is known to be nonadherable. Both films are cleaned with a cloth saturated with a solution of 30% by weight n-propyl alcohol in water. After allowing the film to dry, a drop of the same solution is squeezed from an eye dropper onto the surface of each film. If the film (X) is adherable, the drop will spread at a rate approximately twice as fast as that on film (N), i.e., the area covered by the drop on film (X) will be twice the area covered on film (N) over the same space of time. For example, after about 10–20 seconds from the time of application of the drop, if both films are non-adherable, the drops will spread at approximately the same rate in each application.

Substantially transparent polyvinyl fluoride films treated to impart adherability on one or both sides may be used. When a film with a single adherable side is employed, the adherable side will, of course, be the side which is bonded to the print sheet member.

Conventional print sheet members are used to form the decorative laminated article of this invention. Among the suitable materials are cellulosic substances, such as high grade, absorbent, regenerated α-cellulose paper which has been printed with a design or dyed or pigmented to impart a solid color thereto. Another useful print sheet material is a sheet of fibrillated wet-spun filaments of a polymer of acrylonitrile. These acrylic fiber sheets are known in the paper making art, for example, U.S. Patents 2,810,646 and 3,047,455. Other materials are kraft paper, cotton fabrics, linen fabric, glass fiber fabric, polyester resin fibers, linear superpolyamide fibers, and the like. Printed designs having an unlimited range or form of artistic effect may be employed, so long as the inks or other coloring matter contained therein are non-bleeding in the curable resinous compositions with which the sheet is subsequently saturated and/or coated. It should be noted that these inks or colorants will preferably be resistant to fading under outdoor conditions. In addition, the filaments making up the print sheets may contain minor amounts of such materials as are normally present in textile fibers, e.g., delusterants, antistatic agents, and the like, while the print sheet themselves may also contain minor amounts of any of the softening agents, sizes, coating materials and the like commonly employed in the manufacture of paper.

The print sheet members may be used as such or they may be pre-impregnated with known aminotriazinealdehyde thermosetting resins. These resins as well as techniques for their preparation are shown for example in U.S. Patent Nos. 2,197,357 to Widmer et al. and 2,260,239 to Talbot. These are synthetic resins wherein one or more amino-triazines containing at least two amidogen groups, each having at least one aldehyde-reactable hydrogen atom attached to the amidogen nitrogen atom, e.g., melamine have been reacted with an aldehyde, such as formaldehyde, to yield a potentially thermoset resinous condensate, i.e., one which has been carried to an intermediate stage of condensation whereby it remains a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are employed to impregnate the print sheet, but other aminotriazines, e.g., mono-, di-, and tri-substituted melamines, such as the mono-, di- and trimethylmelamines, and the like; guanamines, such as formoguanamine, acetoguanamine, benzoguanamine, and the like, as well as mixtures of aminotriazines, may also be utilized as reactants. Similarly, formaldehyde either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine and the like, may also be employed. The properties desired in the finished product and economic considerations are among the elements which will determine the choice of the particular aminotriazine and aldehyde employed.

The mol ratio of aldehyde to aminotriazine in the resinous reaction product is not critical, and may be within the order of from about 1:1 to about 6:1, respectively, depending on the nature of the starting materials and the characteristics desired in the final product, but it is preferred that the mol ratio of aldehyde to aminotriazine be within the order of from about 1.5:1 to about 3:1, respectively.

Conventional reaction conditions are observed in preparing the thermosetting aminotriazine-aldehyde resin. Thus, the aldehyde and aminotriazine may be heat-reacted at temperatures ranging from about 40° C. to reflux temperature, i.e., about 100° C., for periods of time ranging from about 30 to about 120 minutes, at a pH ranging from about 7 to about 10, preferably in aqueous medium. Any substance yielding an alkaline aqueous solution may be used to effect alkaline reaction conditions, for example, alkali metal or alkaline earth metal oxides, hydroxides or salts with weak acids, e.g., sodium, potassium or calcium hydroxide or sodium or potassium carbonate. Mono-, di- or triamines, e.g., triethanolamine, alkaline polyamines or polyalkaline polyamines, e.g., 3,3'-iminobispropylamine and the like, may also be used to effect alkaline reaction conditions. When necessary, acidic substances such as hydrochloric acid, sulfuric acid, phosphoric acid, acetic acid, and the like, or salts thereof may also be employed to regulate the pH.

If desired, the thermosetting aminotriazine-aldehyde resin may be modified by the addition thereto of plasticizers such as α-alkyl-D-glucosides, e.g., α-methyl-D-glucoside, as disclosed in U.S. Patent No. 2,773,848 to Lindenfelser, methylol derivatives of sulfonamides, e.g., N-methylol-p-toluenesulfonamide (which may be formed in situ by the addition of p-toluenesulfonamide to the amino-triazine-aldehyde reaction mixture), or combinations of these glucosides and methylol sulfonamides, as disclosed in U.S. Patent No. 2,773,788 to Magrane et al. In addition, the thermosetting aminotriazine-aldehyde resin may also contain curing catalysts, such as phosphoric acid, phthalic acid, p-toluenesulfonic acid, mixtures of alkyl alkylol tertiary amines, e.g., diethylethanolamine, with acids, e.g., acetic acid, and the like although in most cases uncatalyzed resin will be preferred.

When the print sheet member is pre-impregnated with the aminotriazine-aldehyde resin, conventional impregnating conditions and amounts are employed. Thus, the print sheet will be impregnated with from about 35% to 65% by weight, preferably from about 40% to 50% by weight, based on the total dry weight of the impregnated sheet, of the curable resinous composition. Following impregnation, the sheet will be dried at a temperature high enough so that substantially all of the moisture will be driven off but not so high that the curable resinous impregnant will be too far advanced in cure, i.e., to the point at which this resinous reaction mixture will not exhibit satisfactory flow under the relatively high pressure encountered in the subsequent laminating step. A preferred method of drying and partially advancing the curable resinous composition on the print sheet involves a single step wherein the impregnated print sheet is dried at a temperature ranging from about 80° C. to about 150° C. for from about 20 to 5 minutes, low temperatures corresponding to longer times and vice versa, although the same results may be accomplished in several steps as well.

The curable, adhesive mixture used to impregnate and coat the print sheet member (or only to coat if the print sheet has been pre-impregnated with an aminotriazine-aldehyde resin) comprises a mixture of two essential components, designated as (A) and (B). Component (A) is a water-insoluble, essentially linear thermoplastic copolymer prepared from about 50% to 98% by weight, preferably from about 65% to 85% by weight, of (1) a monoethylenically unsaturated hardening comonomer containing no functional groups reactive with functional groups of cross-linking component (B), e.g., N-hydroxymethyl, N-alkoxymethyl, or epoxy groups, and from about 50% to 2% by weight, preferably from about 35% to 10% by weight, of (2) a monoethylenically unsaturated comonomer containing a functional group which is reactive with functional groups of cross-linking component (B), e.g., N-hydroxymethyl, N-alkoxymethyl, or epoxy groups.

By "hardening" comonomer is meant a monomer the homopolymer of which has a glass transition temperature [$T_g$; see Tobolsky, "Properties and Structure of Polymers" (New York, John Wiley & Sons, Inc., 1960), pages 61–71] above about 30–35° C. and which tends to form hard, relatively inflexible polymers. The preferred comonomer (1) is methyl methacrylate. However, other lower alkyl esters of methacrylic acid wherein the lower alkyl group contains from 1 to 4 carbon atoms, e.g., ethyl methacrylate, propyl methacrylate, n-butyl methacrylate, isobutyl methacrylate, and the like, as well as mixtures thereof, can be employed in addition to or instead of methyl methacrylate. Other hardening comonomers, which may be used in place of or in admixture with the lower alkyl esters of methacrylic acid include styrene, alkyl styrenes such as p-methyl styrene and the like, halostyrenes such as chlorostyrene and the like, acrylonitrile, methacrylonitrile, t-amyl methacrylate, t-butyl acrylate, t-amyl acrylate, benzyl methacrylate, vinyl chloride, and the like.

Comonomer (2) is an acrylic acid, including alkacrylic, haloacrylic, and the like, or a mixture of such monomers, and in addition is preferably a hardening comonomer. Preferred reactive group-containing monomers are acrylic acid, methacrylic acid, ethacrylic acid, α-chloroacrylic acid, and the like.

If desired, the reactive copolymer may also include (3) a monoethylenically unsaturated softening comonomer, i.e., a monomer the homopolymer of which has a glass transition temperature below about 15–20° C. and which tends to form soft, relatively flexible polymers, said softening comonmer containing no functional groups which are reactive with functional groups of cross-linking component (B), e.g., N-hydroxymethyl, N-alkoxymethyl, or epoxy groups. These softening monomers preferably comprise an alkyl ester of acrylic acid wherein the alkyl group contains from 1 to about 12 carbon atoms, such as methyl acrylate, ethyl acrylate, propyl acrylate, n-butyl acrylate, 2-ethylhexyl acrylate, octyl acrylate, dodecyl acrylate, and the like, as well as mixtures thereof, and can be present in the copolymer in amounts ranging from 0% to about 45% by weight, and preferably from about 5% to about 25% by weight, based on the total weight of monomers in the copolymer, depending on the properties or combinations of properties, e.g., hardness coupled with flexibility, desired in the final product. Comonomer (3), if employed, will generally replace part of comonomer (1), but in any event, the copolymer will contain not less than about 50% by weight, based on the total weight of monomers in the copolymer, of hardening monomer(s).

Furthermore, in every case the total amount of comonomers (1) and (2) or (1), (2) and (3) employed, will equal 100%.

Suitable emulsion and solution polymerization techniques for the preparation of reactive copolymers of the type employed in practicing the present invention from monomers such as those listed hereinabove are so numerous and so well known in the art that only the most cursory treatment of such techniques is necessary here.

In general, where an emulsion system is used, the selected comonomers are emulsified in water, using from about 1% to about 10% by weight, based on the total weight of monomers present, of a conventional emulsifying agent. This emulsifying agent can be non-ionic, e.g., an alkylphenoxypolyethoxyethanol having alkyl groups of from about 7 to about 18 carbon atoms in length and from about 6 to about 60 oxyethylene units, such as the heptylphenoxypolyethoxyethanols, methyloctylphenoxypolyethoxyethanols, dodecylphenoxypolyethoxyethanols, and the like; a long chain fatty acid derivative of sorbitol, such as sorbitan monolaurate, monopalmitate, monostearate, tristearate, and the like; an ethylene oxide derivative of an etherified or esterified polyhydroxy compound having a hydrophobic carbon chain, such as a polyoxyethylene sorbitan monolaurate, monopalmitate, monostearate, and the like, anionic, e.g., sodium lauryl sulfonate, sodium isopropylnaphthalene sulfonate, di-2-ethylhexyl sodium sulfosuccinate, and the like, or cationic, e.g., stearamidopropyldimethyl-2-hydroxyethylammonium phosphate and the corresponding nitrate, stearyldimethylbenzylammonium chloride, and the like, as well as mixtures thereof.

The emulsified comonomers are copolymerized by means of a catalytic amount of a conventional free radical polymerization catalyst or catalyst system, e.g., an inorganic or organic peroxide such as hydrogen peroxide, t-butyl hydroperoxide, cumene hydroperoxide, and the like, an azo nitrile, such as α,α′-azobisisobutyronitrile and the like, an inorganic persulfate, such as ammonium persulfate, sodium persulfate, potassium persulfate, and the like, or a redox catalyst system, such as sodium metabisulfite-potassium persulfate and the like. The particular catalyst or catalyst system chosen can generally be used in amounts ranging from about 0.01% to about 3% by weight, based on the total weight of comonomers present. The polymerization reaction can be carried out at a temperature ranging from about 0° C. to about 100° C., preferably at from about room temperature (25° C.) to about 70° C., and the emulsion will preferably be agitated during the reaction.

Solution polymerization of the selected comonomers is accomplished by dissolving them, together with a catalytic amount of a conventional free radical polymerization catalyst, e.g., one of the aforementioned organic peroxides, in a suitable inert organic solvent, such as acetone, methylethyl ketone, methyl isobutyl ketone, benzene, toluene, xylene, xylene-isobutanol mixtures, and the like, and heating the resulting solution at a temperature of from about 60° C. to about 190° C. until the desired degree of polymerization has taken place.

The copolymers obtained by the above-described emulsion polymerization technique can have molecular weights ranging from about 25,000 to about 1,000,000 or higher, as determined by intrinsic viscosity measurements [see Flory, "Principles of Polymer Chemistry" (Ithaca, N.Y., Cornell University Press, 1953), pages 308 to 311], while the corresponding solution copolymers will generally have molecular weights ranging from about 10,000 to about 1,000,000, as also determined by intrinsic viscosity measurements.

The second essential component of the curable, adhesive mixture, component (B), is a cross-linking agent which may be one of two materials or an admixture thereof. One cross-linking agent is a 3,4-epoxycyclohexylmethyl 3,4-epoxycyclohexanecarboxylate which has the following formula:

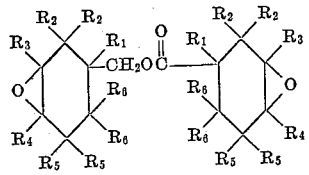

wherein $R_1$, $R_2$, $R_3$, $R_4$, $R_5$ and $R_6$ represent members selected from the group consisting of hydrogen and alkyl groups, as exemplified particularly by 3,4-epoxy-6-methyl-cyclohexylmethyl 3,4 - epoxy - 6-methyl-cyclohexanecarboxylate. These 3,4-epoxycyclohexylmethyl 3,4-epoxy-cyclohexanecarboxylates as well as methods of preparation are disclosed, by example, in U.S. Patents Nos. 2,716,123 and 2,890,209.

A further cross-linking agent is hexamethoxymethyl-melamine. This compound is a commercially available material and methods of preparation are well known in the art. This material is the hexaalkyl ether of hexamethylolmelamine and represents the highest degree of methylolation and alkylation obtainable of the melamine molecule. Various modifications and improvements on the basic process for preparing hexamethoxymethyl-melamine have been developed such as those set forth in U.S. Patents Nos. 2,998,410 to Jefts et al. and 2,998,411 to Housekeeper, herein incorporated by reference.

The curable, adhesive mixture used to coat the fibrous print sheet is prepared by dispersing the cross-linking agent in th copolymer emulsion or, where the copolymer has been prepared from an organic solvent solution, by dissolving the copolymer and cross-linking agent in a readily volatile inert organic solvent, e.g., one having a boiling point at atmospheric pressure between about 60° C. and 190° C., preferably between about 90° C. and 120° C. Such solvents include acetone, methyl ethyl ketone, diethyl ketone, benzene, toluene, xylene, ethyl acetate, butyl acetate, ethylene glycol monomethyl ether, dioxane, and the like, or a mixture of two or more of such solvents. As a third alternative, when the reactive copolymer is prepared by the emulsion polymerization technique, the emulsion or dispersion containing the copolymer may be first coagulated, e.g., by the addition of acetone, and the copolymer then separated from the coagulum and dissolved in an inert organic solvent. The cross-linking agent is then added. The weight ratio of reactive copolymer: cross-linking agent in solution can range from about 85:15 to about 60:40, respectively, and preferably from about 75:25 to about 65:35, respectively, while, for most applications, the total amount of the reactive copolymer plus cross-linking agent present in the impregnating solution can range from about 15% to about 60% by weight, and preferably from about 25% to about 50% by weight, based on the total weight of said solution.

It will be obvious to those skilled in the art that whether a high or low molecular weight copolymer is employed, the solids content of the adhesive mixture may be adjusted by dilution or concentration to obtain a suitable coating viscosity. Hence, molecular weights and solids content may be varied widely. However, where an unimpregnated print sheet paper is employed, organic solvent solutions of reactive copolymers prepared by the solution polymerization technique are required since the generally higher molecular weight of emulsion copolymers porhibits their use as impregnating agents. When the print sheet has been preimpregnated, either an organic solution of the copolymer or a copolymer emulsion (latex) may be employed.

Any conventional method, e.g., dip-, brush-, flow-, roller- or spray-coating, can be used in coating the print sheet member with the solution of the curable, adhesive mixture comprising the reactive copolymer and the cross-linking agent. When the print sheet has not been preimpregnated with the aminotriazine-aldehyde resin, it will be impregnated and coated with from about 35% to about 65% by weight, and preferably from about 40% to about 50% by weight, based on the total dry weight of the impregnated sheet, of the curable, adhesive mixture containing the resin in an organic solvent. The desired degree of impregnation and coating can be achieved by one or several treating passes and, as can be readily appreciated, where several passes are made the solids content of the impregnating solution can be low, while for one-pass operations higher solids contents will be required.

Where the print sheet has been pre-impregnated with an aminotriazine-aldehyde resin, less of the curable, adhesive mixture will be required on the surface of the print sheet. A coating of from about 5 to 20 grams per sq. ft., preferably 7 to 15 grams per sq. ft., will be adequate to provide adhesion of the print sheet to an adherable side of the substantially transparent polyvinyl fluoride top film. In any case, whether or not the print sheet has been pre-impregnated, the amount of resinous adhesive mixture will be that quantity necessary to achieve a tight bond between the polyvinyl fluoride top film and print sheet and obviously may vary within wide limits depending on choice of print sheet and solids content and molecular weight of the reactive copolymer.

Following impregnation and/or coating, the print sheet will be dried at a temperature high enough so that substantially all of the inert organic solvent will be driven off and yet low enough so that the curable resin will not be substantially advanced in cure, i.e., to the point at which this resinous reaction mixture will not exhibit satisfactory flow under the relatively high pressures encountered in the subsequent laminating step, and thus will not flow sufficiently to eliminate small pits, dents and other minor imperfections in the resinous layer. However, a certain amount of advancement, i.e., cross-linking between the reactive copolymer and the cross-linking agent, is desirable prior to the time at whcih the entire laminating assembly is consolidated in a laminating press, inasmuch as this insures that the curable resinous composition will not be squeezed out of the print sheet member in the press before being substantially completely cured. Furthermore, since cross-linking takes place fairly rapidly at temperatures above about 100° C., it is evident that any desired degree of advancement in cross-linking can be accomplished either during the drying step, if drying is carried out at sufficiently elevated temperatures or subsequent to the time at which the adhesive mixture-covered print sheet can be considered substantially dry, by an additional heating period at temperatures substantially above room temperature, if drying is carired out at relatively lower temperatures, e.g., room temperature.

A two-stage method of drying and partially advancing the curable resinous composition on the print sheet is preferred. The first, or drying stage, involve drying the treated sheet at a temperature ranging from about room temperature, i.e., about 25° C., to not more than about 150° C. for from about 30 seconds at the upper temperatures in this range to several hours, e.g., four hours or more, at the lower end of the range, depending, of course, on the solvent employed as well as the drying temperature. Preferably, drying will be accomplished by subjecting the impregnated sheet to a temperature of from about 80° C. to about 130° C. for from about 3 minutes to about 10 minutes. The second stage, during which the curable resinous composition on the substantially dry print sheet is partially advanced in cure, will be carried out at a temperature of from about 110° C. to about 150° C. for from about 2 minutes to about 10 minutes.

As previously indicated, drying and partial advancement of the curable resinous composition used to treat the print sheet can also be carried out in one step rather than in separate stages. However, care must be taken to avoid heating the coated sheet to the point at which the inert organic solvent being given off causes bubbling, since this can cause discontinuity, which in turn leads to poor bonding, particularly if, at the same time, the curable resinous composition is advanced to the point at which its flow under the relatively high pressures applied in the subsequent laminating step will be substantially diminished. Thus, one step drying (coupled with partial advancement) will preferably be carried out at a temperature ranging from about 80° C. to about 150° C. for from about 5 minutes to about 20 minutes.

An alternative procedure would be to coat an adherable side of the polyvinyl fluoride surface film with the thermosetting resinous adhesive mixture, partially advance the cure of the resin, and then proceed with the heat- and pressure-consolidation step to bond the overlay film to the print sheet and print sheet to rigidity-imparting base member. This procedure is preferred when the print sheet member has been pre-impregnated with an aminotriazine-aldehyde resin.

Any of a plurality of conventional materials can be employed as the base or core member in the novel laminated articles of this invention. This is due primarily to the fact that the base member cannot be seen when the laminate is in use, and also because this part of the laminate is not subjected to the same degree of wear as the decorative surface. The base member functions to impart rigidity to the laminate, and comprises a solid substrate which may or may not be formed prior to the initial laminating step, e.g., a plurality of sheets of Kraft paper impregnated throughout and bonded with a substantially completely cured phenolic resin which has been converted to the thermoset state during the initial laminating step, a precured plastic laminate, such as glass fiber-reinforced thermoset polyester resin laminates and the like, a wood product, such as hardboard, woodwaste or particle boards, plywood, and the like, a mineral base board, such as an epoxy-polyamine resin-treated cement-asbestos board, sheet rock, plaster board and the like, or a combination of these substrates, e.g., a combination of a plurality of phenolic resin-impregnated kraft paper sheets over a piece of cement-asbestos board, particle board, or the like.

One highly suitable class of base members comprises the aforementioned phenolic resin-impregnated paper base members. Such base members are preferably united with the print sheet member and the clear, protective top film by employing, as the bottommost member of an individual laminating assembly, one or more sheets or plies of a low-cost kraft paper, creped kraft paper, or both, which have been impregnated with the least amount of a thermosetting phenolic resin capable of providing a good bond in the core assembly, e.g., amounts of phenolic resin ranging from about 25% to about 40% by weight, based on the total dry weight of the impregnated paper.

Ordinarily, from about 5 to about 8 sheets of phenolic resin-impregnated paper will be used, thereby providing a base member which, in the finished laminate, will usually be at least about one sixteenth of an inch thick. It should be noted, however, that laminates of this type wherein the thickness of the entire assembly of the top film, print sheet and base members is as little as about one thirty-second of an inch or less, as obtained, for example, by using fewer phenolic resin-impregnated sheets in the base member, can be prepared and are suitable for many uses. Thus, neither the number of sheets of paper, the amount of phenolic resin, nor the thickness ultimately achieved in a base member of this type is critical. However, it has been found that a thickness of at least one sixteenth of an inch is especially desirable when the laminate is consolidated, either during the initial laminating step by means of heat and pressure or afterwards by adhesive bonding, with an additional solid or precured substrate of the type mentioned hereinabove, e.g., a piece of asbestos-cement board, particle board, or the like, in that phenolic resin-impregnated paper base members having at least this minimum thickness are better able to relieve or take up stresses produced by these additional substrates, certain of which are relatively dimensionally unstable, thereby preventing cracking or crazing on the decorative surface of the laminate. It has also been found that even where no phenolic resin-impregnated paper base member is used, the thickness of the solid substrate used in its place should be at least about one sixteenth of an inch for the same reason, with the thickness of any particular solid substrate chosen being correlated with its density whereby said substrate is adapted to retain its form under moderate stress. The maximum thickness of any of the base members in question is governed by practical considerations, e.g., cost, availability, where and how the finished laminate is to be used, and so forth.

The thermosetting phenolic resins used to impregnate a base or core member comprising one or more sheets of kraft or creped kraft paper are well known in the art as shown, for example, in U.S. Patents Nos. 2,205,427, 2,315,087 and 2,328,592, among others, which are incorporated herein by reference. These resins are conventionally obtained by reacting a phenolic substance such as phenol itself, substituted phenols, e.g., alkyl phenols such as cresols, xylenols, tertiary alkyl phenols, and the like, or mixtures of such phenolic substances, with an aldehyde such as formaldehyde, acetaldehyde, propionaldehyde, benzaldehyde, furfural, and the like, or with mixtures of such aldehydes, either alone or in the presence of other aldehyde-reactable substances, such as urea, thiourea, substituted ureas and thoureas, aminotriazines, e.g., melamine, lignin derivatives, and the like.

Conventional laminating techniques are employed in preparing laminates from the above-described base members, impregnated and/or coated print sheets, and substantially transparent top films. Thus, the adherable polyvinyl fluoride top film is placed with an adherable side against the thermosetting adhesive mixture-covered side of the print sheet member or, where the polyvinyl fluoride top film is coated with the adhesive resin on an adherable side, said film is placed with its coated side against the print sheet member. Then top film and print sheet are assembled with the base member, or plurality of sheets or boards constituting the base member, and inserted in a laminating press between laminating press plates, e.g., stainless steel press plates which may have finishes ranging from a mirror polish to a matt surface, either as a single assembly or a multiple assembly of two or more of such single assemblies, and consolidated by means of heat and pressure into a unitary decorative structure. Besides laminates having only one decorative surface, balanced laminates wherein a mirror-image assembly of the decorative members is bonded to each side of a base or core member may also be prepared.

Temperatures ranging from about 135° C. to about 160° C., preferably from about 140° C. to about 150° C., and pressures ranging from about 150 p.s.i. to about 1500 p.s.i., will be employed. The particular pressure employed depends in large measure upon the nature of the base member and clear, protective top film employed. For example, where a conventional "low pressure" substrate, e.g., flakeboard, plywood, and the like, is used, pressures ranging from about 150 to about 350 p.s.i., and preferably from about 250 to about 300 p.s.i., will be used. Conversely, when a conventional "high pressure" substrate, e.g., a plurality of sheets of phenolic resin-impregnated paper and the like, is used, pressures ranging from about 600 to about 1500 p.s.i., and preferably from about 1100 to about 1200 p.s.i., will generally be employed. The time required to effect substantially complete cure of the resinous components of the assembly when employing temperatures and pressures within the above-stated ranges will usually be from 15 minutes to about 45 minutes. The resulting laminate is generally allowed to cool to a temperature of less than about 50° C., and preferably to room temperature, before being removed from the press.

In order that those skilled in the art may more fully understand the inventive concept presented herein, the following examples are set forth. These examples are set forth primarily for illustration, and should not be considered as expressing limitations unless so set forth in the appended claims. All parts and percentages are by weight, unless otherwise stated.

PREPARATION OF CURABLE ADHESIVE RESINS

An adhesive mixture typical of the curable adhesive resins useful in the practice of the present invention may be prepared as follows:

*Adhesive resin A (based on 90/10-methyl methacrylate/methacrylic acid)*

A solution containing 6 parts of dioctyl sodium sulfosuccinate, 11.4 parts of a 70% active solution of a octylphenol-ethylene oxide condensate, and 0.8 part of sodium bicarbonate dissolved in 1100 parts of water is charged to a suitable reaction vessel equipped with thermometer, stirrer, reflux condenser, inert gas inlet tube and addition funnel. After flushing the solution with nitrogen gas for 30 minutes (a stream of nitrogen gas is employed to maintain an inert atmosphere throughout the reaction) and then heating it to 60° C. with stirring (stirring being maintained throughout the preparation), a solution of 1 part of ammonium persulfate in 100 parts of water is added. Five minutes later, after heating the resulting solution to 75° C., 164 parts of a monomer-emulsifier mixture containing 720 parts of methyl methacrylate, 80 parts of methacrylic acid and 17.2 parts of the same octylphenol-ethylene oxide condensate solution used above are added. At this point, the temperature of the resulting emulsified reaction will rise exothermally to 85° C. When the temperature begins to drop, the remainder of the monomer-emulsifier mixture is added dropwise to the emulsion over a period of about one hour, during which time the temperature is maintained at between 77° C. and 82° C. After the last addition of the monomer-emsulifier mixture, the emulsion is maintained at between about 75° C. and 80° C. for 30 minutes and then allowed to cool to room temperature. During cooling, the reflux condenser and thermometer are removed and a rapid stream of nitrogen gas is passed through the reaction vessel to remove any unreacted monomers. Finally, the pH is adjusted to 8.2 with concentrated ammonia and the product is then filtered through cheesecloth, to give an aqueous polymer dispersion having a solids content of 45.7%.

A quantity of this resinous dispersion is admixed with sufficient methylethyl ketone to coagulate and precipitate the methyl methacrylate/methacrylic acid copolymer. The coagulum is then poured into a shallow container and dried at 80° C. until substantially all of the ketone and water have evaporated. Next, the copolymer solids are dissolved in the ketone to give a 50% solution, and to this solution there is then added and dissolved an amount of 3,4-epoxy-6-methylcyclohexylmethyl, 3,4-epoxy-6-methylcyclohexane-carboxylate (hereinafter called "diepoxide") sufficient to result in a weight ratio of copolymer solids: diepoxide of 100:30, respectively.

PREPARATION OF ADHESIVE RESINS B–K

In a manner similar to that set forth for the preparation of adhesive resin A, the aqueous dispersions described in Table I below in terms of their polymeric components, pH's and solids concentrations may be prepared, coagulated, and dissolved in organic solvent in preparation for use as adhesives.

TABLE I

| Dispersion | Polymeric Component [1] | pH | Percent Solids Concentration |
|---|---|---|---|
| B | 60/30/10—MMA/EA/MAA | 7.6 | 41 |
| C | 60/35/5—MMA/EA/MAA | 7.1 | 41.7 |
| D | 45/25/20/10—MMA/EA/AN/MAA | 7.5 | 39 |
| E | 50/25/20/5—MMA/EA/AN/MAA | 7.6 | 42 |
| F | 85/15—BMA/MAA | 7.5 | 35 |
| G | 60/25/15—MMA/BMA/MAA | 7.0 | 35 |
| H | 75/15/10—MMA/EHA/MAA | 7.8 | 41 |
| I | 80/10/10—MMA/EA/MAA | | 50 |
| J | 50/25/20/5—MMA/EA/AN/MAA | | 40 |
| K | 60/35/5—S/EA/MAA | 8.1 | 40 |

[1] Monomers are expressed in parts, e.g., Dispersion B contains a copolymer of 60 parts of methyl methacrylate, 30 parts of ethyl acrylate and 10 parts of methacrylic acid.
MMA=methyl methacrylate, BMA=butyl methacrylate, S=styrene, EA=ethyl acrylate, EHA=2-ethylhexyl acrylate, AN=acrylonitrile, MAA=methacrylic acid, MA=methacrylamide.

EXAMPLE I

A 35.5 lb. basis weight grade water-laid acrylic fiber print sheet (hereinafter called "Paper X"), about 6 mils thick, made up of fibrillated wet-spun filaments of a copolymer of 90 parts of acrylonitrile and 10 parts of methyl methacrylate, is dipped in the methylethyl ketone solution of adhesive resin I (80/10/10–MMA/EA/MAA) to give an impregnated and coated print sheet having a resin pickup of the curable resinous composition (reactive copolymer and diepoxide) of 50 to 60%, based on the total dry weight of the impregnated and coated sheet. Next, the impregnated and coated print sheet is air-dried at room temperature to allow the ketone to evaporate therefrom.

The dried, impregnated and coated acrylic fiber print sheet is incorporated in a laminated assembly consisting of (from the bottom up) 3 sheets of standard thermosetting phenolic resin-impregnated creped kraft paper, 4 sheets of standard thermosetting phenolic resin-impregnated uncreped kraft paper, the print sheet, and a substantially transparent commercially-available film of adherable polyvinyl fluoride, 1 mil thick, adherable side facing the impregnated and coated print sheet member. The entire assembly is then positioned between a pair of stainless steel press plates having a mirror polish finish and laminated at a temperature of 140° C. under a pressure of 1100 p.s.i. for 15 minutes. The resulting laminate, after being allowed to cool to room temperature, is removed from the press and has a smooth, glossy decorative surface.

EXAMPLES II–VI

In the same manner the other resins listed in Table I may be coagulated, admixed with either diepoxide or hexamethoxymethylamine as cross-linking agent in an organic solvent, and applied as an adhesive coating on either the print sheet member or on an adherable side of the polyvinyl fluoride top film. The treated print sheet or top film may then be dried and advanced in a conventional manner. Thereafter the polyvinyl fluoride top film is placed on the print sheet with the adhesive resin between, assembled with suitable rigidity-imparting base members, and heat- and pressure-consolidated under conventional laminating conditions. Table II below illustrates other particular embodiments of this invention. In each example, the curable adhesive resinous admixture comprised adhesive resin I of Table I and diepoxide cross-linking agent in a copolymer solids:diepoxide weight ratio of 100:30, respectively. In each case the laminate maintained its clear decorative appearance after prolonged exposure to both simulated and actual extreme conditions of weather and the bond between the laminae withstood 2 hours' immersion in boiling water without delamination. Essentially the same results are achieved when the print sheet has been preimpregnated with a melamine-formaldehyde resin and an emusion of the reactive copolymer is used as the adhesive mixture coating on the print sheet.

TABLE II

| Ex. | Base Member | Print Sheet | Resin Pickup on Print Sheet (g./ft.²) | Thickness of Top Film [6] (mils) | Advancing Temp. (° C.) | Advancing Time (min.) | Laminating and cure Pres. (p.s.i.) | Laminating and cure Temp. (° C.) | Laminating and cure Time (min.) | Weather Tests FUW[4] (hrs.) | Weather Tests XEON[5] (hrs.) | Weather Tests Outdoors, months |
|---|---|---|---|---|---|---|---|---|---|---|---|---|
| II | CAB[1] | Paper X | 10 | 1 | 1st. Coat 135. | 1 | 500 | 165 | 30 | 5,000 | 4,000 | 6 |
|  |  |  |  |  | 2nd. Coat 135. | 4 |  |  |  |  |  |  |
| III | CAB | Cellulose | 18 | 1 | 1st. Coat 135. | 5 |  |  |  |  |  |  |
|  |  |  |  |  | 2nd. Coat 135. | 5 | 1,100 | 165 | 30 | 5,000 | 4,000 | 6 |
| IV | CAB | M/F[3]-impreg. Cellulose. | 13 | 1 | 135 | 7 | 1,100 | 165 | 30 | 5,000 | 4,000 | 6 |
| V | PC[2] | M/F-impreg. Cellulose. | 14 | 4 | 1st. Coat 135. | 2 |  |  |  |  |  |  |
|  |  |  |  |  | 2nd. Coat 135. | 6 | 800 | 160 | 30 | 2,000 | 2,000 | 3 |
| VI | PC | Cellulose | 14 | 4 | 1st. Coat 135. | 5 |  |  |  |  |  |  |
|  |  |  |  |  | 2nd. Coat 135. | 5 |  |  |  |  |  |  |

[1] CAB=cement asbestos board sized with a commercially-available epoxy-polyamine resin.
[2] PC=phenolic resin-impregnated Kraft paper.
[3] M/F=commercially available melamine-formaldehyde resin.
[4] FUW=fluorescent-ultraviolet weatherometer.
[5] XENON=Model 60-WR Atlas Weather-O-Meter operated according to ASTM D-1499-59T.
[6] A commercially-available transparent (non-pigmented) polyvinyl fluoride film ("TEDLAR"), one or both sides having been treated to impart adherability.

COMPARATIVE EXAMPLES

Attempts to permanently bond transparent adherable films of polyvinyl fluoride to the print sheets and base members as in Examples I to VI failed when the resinous adhesive mixture of these examples was replaced by certain commercially available resinous adhesives. Although a good initial bond was achieved in some cases, delamination (peeling away of the surface layer) occurred after less than 800 hours exposure in the weatherometer devices. In further tests, even a good initial bond could not be obtained when the adhesive resins of Examples I to VI were employed without the diepoxide or hexamethoxymethylmelamine cross-linking agents.

I claim:

1. A unitary, heat- and pressure-consolidated, weather-resistant decorative laminated article which comprises:
(I) a rigidity-imparting base member,
(II) a print sheet member bonded to said base member and coated with a substantially cured composition which, in its uncured state, is a curable adhesive mixture comprising
  (A) a reactive, water-insoluble essentially linear copolymer of
    (1) from about 50% to 98% by weight of a monoethylenically unsaturated hardening comonomer containing no functional groups reactive with component (B), as defined hereinbelow,
    (2) from about 50% to 2% by weight of a monoethylenically unsaturated comonomer containing at least one functional group reactive with component (B), and
    (3) from about 0% to 45% by weight of a monoethylenically unsaturated softening comonomer containing no functional groups reactive with component (B),
  wherein the sum of the amounts of (1), (2) and (3) is 100%, and
  (B) a cross-linking amount of a member selected from the group consisting of a 3,4-epoxycyclohexylmethyl 3,4-epoxycyclohexanecarboxylate and hexamethoxymethylmelamine, and
(III) a substantially transparent top film of adherable polyvinyl fluoride, an adherable side of which is directly bonded to said print sheet member by means of said adhesive mixture.

2. A unitary, heat- and pressure-consolidated, weather-resistant decorative laminated article which comprises:
(I) a rigidity-imparting base member,
(II) a print sheet member bonded to said base member and coated with a substantially cured composition which, in its uncured state, is a curable adhesive mixture comprising
  (A) a reactive, water-insoluble essentially linear copolymer of
    (1) from about 50% to 98% by weight of a monoethylenically unsaturated hardening comonomer containing no functional groups reactive with component (B), as defined hereinbelow,
    (2) from about 50% to 2% by weight of a monoethylenically unsaturated comonomer containing at least one functional group reactive with component (B), and
    (3) from about 0% to 45% by weight of a monoethylenically unsaturated softening comonomer containing no functional groups reactive with component (B),
  wherein the sum of the amounts of (1), (2) and (3) is 100%, and
  (B) a cross-linking amount of a 3,4-epoxycyclohexylmethyl 3,4-epoxycyclohexanecarboxylate, and
(III) a substantially transparent top film of adherable polyvinyl fluoride, an adherable side of which is directly bonded to said print sheet member by means of said adhesive mixture.

3. A unitary, heat- and pressure consolidated, weather-resistant decorative laminated article which comprises:
(I) a rigidity-imparting base member,
(II) a print sheet member bonded to said base member and coated with a substantially cured composition which, in its uncured state, is a curable adhesive mixture comprising
  (A) a reactive, water-insoluble essentially linear copolymer of
    (1) from about 50% to 98% by weight of a monoethylenically unsaturated hardening comonomer containing no functional groups reactive with component (B), as defined hereinbelow,
    (2) from about 50% to 2% by weight of a monoethylenically unsaturated comonomer containing at least one functional group reactive with component (B), and
(3) from about 0% to 45% by weight of a monoethylenically unsaturated softening comonomer containing no functional groups reactive with component (B),
wherein the sum of the amounts of (1), (2) and (3) is 100%, and
(B) a cross-linking amount of hexamethoxymethylmelamine, and
(III) a substantially transparent top film of adherable polyvinyl fluoride, an adherable side of which is directly bonded to said print sheet member by means of said adhesive mixture.

4. A unitary, heat- and pressure-consolidated, weather-resistant decorative laminated article which comprises:
(I) a rigidity-imparting base member,
(II) a print sheet member bonded to said base member and coated with a substantially completely cured composition which, in its uncured state, is a curable, adhesive mixture comprising
(A) a reactive, water-insoluble essentially linear copolymer of
(1) from about 50% to 98% by weight of a lower alkyl ester of methacrylic acid,
(2) from about 50% to 2% by weight of an acrylic acid, and
(3) from about 0% to 45% by weight of a $C_{1-12}$ alkyl ester of acrylic acid,
wherein the sum of the amounts of (1), (2) and (3) is 100%, and
(B) a cross-linking amount of a member selected from the group consisting of a 3,4-epoxycyclohexylmethyl 3,4-epoxycyclohexanecarboxylate and hexamethoxymethylmelamine, and
(III) a substantially transparent top film of adherable polyvinyl fluoride, an adherable side of which is directly bonded to said print sheet member by means of said adhesive mixture.

5. A unitary, heat- and pressure-consolidated, weather-resistant decorative laminated article which comprises:
(I) a rigidity-imparting base member,
(II) a print sheet member bonded to said base member and coated with a substantially completely cured composition which, in its uncured state, is a curable, adhesive mixture comprising
(A) a reactive, water-insoluble essentially linear copolymer of
(1) from about 50% to 98% by weight of a lower alkyl ester of methacrylic acid,
(2) from about 50% to 2% by weight of an acrylic acid, and
(3) from about 0% to 45% by weight of a $C_{1-12}$ alkyl ester of acrylic acid,
wherein the sum of the amounts of (1), (2) and (3) is 100%, and
(B) a cross-linking amount of 3,4-epoxycyclohexylmethyl 3,4-epoxycyclohexanecarboxylate, and
(III) a substantially transparent top film of adherable polyvinyl fluoride, an adherable side of which is directly bonded to said print sheet member by means of said adhesive mixture.

6. A unitary, heat- and pressure-consolidated, weather-resistant decorative laminated article which comprises:
(I) a rigidity-imparting base member,
(II) a print sheet member bonded to said base member and coated with a substantially completely cured composition which, in its uncured state, is a curable, adhesive mixture comprising
(A) a reactive, water-insoluble essentially linear copolymer of
(1) from about 50% to 98% by weight of a lower alkyl ester of methacrylic acid,
(2) from about 50% to 2% by weight of an acrylic acid, and
(3) from about 0% to 45% by weight of a $C_{1-12}$ alkyl ester of acrylic acid,
wherein the sum of the amounts of (1), (2) and (3) is 100%, and
(B) a cross-linking amount of hexamethoxymethylmelamine, and
(III) a substantially transparent top film of adherable polyvinyl fluoride, an adherable side of which is directly bonded to said print sheet member by means of said adhesive mixture.

7. A unitary, heat- and pressure-consolidated, weather-resistant decorative laminated article which comprises:
(I) a rigidity-imparting base member,
(II) a print sheet member bonded to said base member, impregnated throughout with a substantially completely cured aminotriazine-aldehyde resin, and coated with a substantially completely cured composition which, in its uncured state, is a curable, adhesive mixture comprising
(A) a reactive, water-insoluble essentially linear copolymer of
(1) from about 50% to 98% by weight of a lower alkyl ester of methacrylic acid,
(2) from about 50% to 2% by weight of an acrylic acid, and
(3) from about 0% to 45% by weight of a $C_{1-12}$ alkyl ester of acrylic acid,
wherein the sum of the amounts of (1), (2) and (3) is 100%, and
(B) a cross-linking amount of a member selected from the group consisting of a 3,4-epoxycylohexylmethyl 3,4-epoxycyclohexane-carboxylate and hexamethoxymethylmelamine, and
(III) a substantially transparent top film of adherable polyvinvyl fluoride, an adherable side of which is directly bonded to said print sheet member by means of said adhesive mixture.

8. A unitary, heat- and pressure-consolidated, weather-resistant decorative laminated article which comprises:
(I) a rigidity-imparting base member,
(II) a print sheet member bonded to said base member, impregnated throughout with a substantially completely cured aminotriazine-aldehyde resin, and coated with a substantially completely cured composition which, in its uncured state, is a curable, adhesive mixture comprising
(A) a reactive, water-insoluble essentially linear copolymer of
(1) from about 50% to 98% by weight of a lower alkyl ester of methacrylic acid,
(2) from about 50% to 2% by weight of an acrylic acid, and
(3) from about 0% to 45% by weight of a $C_{1-12}$ alkyl ester of acrylic acid,
wherein the sum of the amounts of (1), (2) and (3) is 100%, and
(B) a cross-linking amount of a 3,4-epoxycyclohexylmethyl 3,4-epoxycyclohexanecarboxylate, and
(III) a substantially transparent top film of adherable polyvinyl fluoride, an adherable side of which is directly bonded to said print sheet member by means of said adhesive mixture.

9. A unitary, heat- and pressure-consolidated, weather-resistant decorative laminated article which comprises:
(I) a rigidity-imparting base member,
(II) a print sheet member bonded to said base member, impregnated throughout with a substantially completely cured aminotriazine-aldehyde resin, and coated with a substantially completely cured composition which, in its uncured state, is a curable, adhesive mixture comprising (A) a reactive, water-insoluble essentially linear copolymer of
(1) from about 50% to 98% by weight of a lower alkyl ester of methacrylic acid,
(2) from about 50% to 2% by weight of an acrylic acid, and
(3) from about 0% to 45% by weight of a $C_{1-12}$ alkyl ester of acrylic acid,
wherein the sum of the amounts of (1), (2) and (3) is 100%, and
(B) a cross-linking amount of hexamethoxymethylmelamine, and
(III) a substantially transparent top film of adherable polyvinyl fluoride, an adherable side of which is directly bonded to said print sheet member by means of said adhesive mixture.

10. A process for preparing a unitary, weather-resistant, decorative laminated article which comprises:
(I) coating a print sheet member with a curable adhesive mixture comprising
(A) a reactive, water-insoluble essentially linear copolymer of
(1) from about 50% to 98% by weight of a monoethylenically unsaturated hardening comonomer containing no functional groups reactive with component (B), as defined hereinbelow,
(2) from about 50% to 2% by weight of a monoethylenically unsaturated comonomer containing at least one functional group reactive with component (B), and
(3) from about 0% to 45% by weight of a monoethylenically unsaturated softening comonomer containing no functional groups reactive with component (B),
wherein the sum of the amounts of (1), (2) and (3) is 100%, and
(B) a cross-linking amount of a member selected from the group consisting of a 3,4-epoxycyclohexylmethyl 3,4 - epoxycyclohexanecarboxylate and hexamethoxymethylmelamine,
(II) overlaying said print sheet member with a substantially transparent top film of adherable polyvinyl fluoride whereby an adherable side of said polyvinyl fluoride film is in contact with the adhesive mixture-coated surface of said print sheet member, and
(III) heat- and pressure-consolidating the entire assembly with a rigidity-imparting base member.

11. A process for preparing a unitary, weather-resistant, decorative laminated article which comprises:
(I) coating a print sheet member with a curable adhesive mixture comprising
(A) a reactive, water-insoluble essentially linear copolymer of
(1) from about 50% to 98% by weight of a monoethylenically unsaturated hardening comonomer containing no functional groups reactive with component (B), as defined herein below,
(2) from about 50% to 2% by weight of a monoethylenically unsaturated comonomer containing at least one functional group reactive with component (B), and
(3) from about 0% to 45% by weight of a monoethylenically unsaturated softening comonomer containing no functional groups reactive with component (b),
wherein the sum of the amounts of (1), (2) and (3) is 100%, and
(B) a cross-linking amount of a 3,4-epoxycyclohexylmethyl 3,4-epoxycyclohexanecarboxylate,
(II) overlaying said print sheet member with a substantially transparent top film of adherable polyvinyl fluoride whereby an adherable side of said polyvinyl fluoride film is in contact with the adhesive mixture-coated surface of said print sheet member, and
(III) heat- and pressure-consolidating the entire assembly with a rigidity-imparting base member.

12. A process for preparing a unitary, weather-resistant, decorative laminated article which comprises:
(I) coating a print sheet member with a curable adhesive mixture comprising
(A) a reactive, water-insoluble essentially linear copolymer of
(1) from about 50% to 98% by weight of a monoethylenically unsaturated hardening comonomer containing no functional groups reactive with component (B), as defined hereinbelow,
(2) from about 50% to 2% by weight of a monoethylenically unsaturated comonomer containing at least one functional group reactive with componendt (B), and
(3) from about 0% to 45% by weight of a monoethylenically unsaturated softening comonomer containing no function groups reactive with component (B),
wherein the sum of the amounts of (1), (2) and (3) is 100%, and
(B) a cross-linking amount of hexamethoxymethylmelamine,
(II) overlaying said print sheet member with a substantially transparent top film of adherable polyvinyl fluoride whereby an adherable side of said polyvinyl fluoride film is in contact with the adhesive mixture-coated surface of said print sheet member, and
(III) heat- and pressure-consolidating the entire assembly with a rigidity-imparting base member.

13. A process for preparing a unitary, weather-resistant, decorative laminated article which comprises:
(I) coating a print sheet member with a curable adhesive mixture comprising
(A) a reactive, water-insoluble essentially linear copolymer of
(1) from about 50% to 98% by weight of a lower alkyl ester of methacrylic acid,
(2) from about 50% to 2% by weight of an acrylic acid, and
(3) from about 0% to 45% by weight of a $C_{1-12}$ alkyl ester of acrylic acid,
wherein the sum of the amounts of (1), (2) and (3) is 100%, and
(B) a cross-linking amount of a member selected from the group consisting of a 3,4-epoxycyclohexylmethyl 3,4 - epoxycyclohexanecarboxylate hexamethoxyethylmelamine, and
(II) overlaying said print sheet member with a substantially transparent top film of adherable polyvinyl fluoride whereby an adherable side of said polyvinyl fluoride film is in contact with the adhesive mixture-coated surface of said print sheet member, and
(III) heat- and pressure-consolidating the entire assembly with a rigidity-imparting base member.

14. A process for preparing a unitary, weather-resistant, decorative laminated article which comprises:
(I) coating a print sheet member, impregnated throughout with a substantially completely cured aminotriazinealdehyde resin, with a curable adhesive mixture comprising
(A) a reactive, water-insoluble essentially linear copolymer of
(1) from about 50% to 98% by weight of a lower alkyl ester of methacrylic acid,
(2) from about 50% to 2% by weight of an acrylic acid, and
(3) from about 0% to 45% by weight of a $C_{1-12}$ alkyl ester of acrylic acid,
wherein the sum of the amounts of (1), (2) and (3) is 100%, and (B) from about 5% to 100% by weight, based on the weight of (A), of a member selected from the group consisting of a 3,4-epoxycyclohexylmethyl 3,4-epoxycyclohexanecarboxylate and hexamethoxymethylmelamine, (II) overlaying said print sheet member with a substantially transparent top-film of adherable polyvinyl fluoride whereby an adherable side of said polyvinyl fluoride film is in contact with the adhesive mixture-coated surface of said print sheet member, and (III) heat- and pressure-consolidating the entire assembly with a rigidity-imparting base member.

References Cited

UNITED STATES PATENTS

| | | | |
|---|---|---|---|
| 3,153,683 | 10/1964 | Bryan et al. | 264—80 |
| 3,153,684 | 10/1964 | Bryan et al. | 264—80 |
| 3,218,225 | 11/1965 | Petropoulos | 161—248 |
| 3,228,823 | 1/1966 | Usala et al. | 156—330 X |

EARL M. BERGERT, *Primary Examiner.*

HAROLD ANSHER, *Examiner.*

CERTIFICATE OF CORRECTION

Patent No. 3,340,137 September 5, 1967

Musa Rasim Kamal

It is hereby certified that error appears in the above numbered patent requiring correction and that the said Letters Patent should read as corrected below.

Column 7, line 17, for "by" read -- for --; line 67, for "porhibits" read -- prohibits --; column 8, line 38, for "whcih" read -- which --; column 10, line 29, for "thoureas" read -- thioureas --; column 12, line 35, for "laminated" read -- laminating --; line 53, for "hexamethoxymethylamine" read -- hexamethoxymethylmelamine --; column 18, line 19, for "componendt" read -- component --; line 22, for "function" read -- functional --; line 52, for "hexamethoxyethylmelamine" read -- hexamethoxymethylmelamine --.

Signed and sealed this 29th day of October 1968.

(SEAL)
Attest:

EDWARD M. FLETCHER, JR.
Attesting Officer

EDWARD J. BRENNER
Commissioner of Patents